United States Patent
Kim et al.

(10) Patent No.: US 10,003,921 B2
(45) Date of Patent: Jun. 19, 2018

(54) METHOD AND APPARATUS FOR SEARCHING FOR PROXIMITY SERVICE SO AS TO PROVIDE PROXIMITY SERVICE

(71) Applicant: LG ELECTRONICS INC., Seoul (KR)

(72) Inventors: Laeyoung Kim, Seoul (KR); Jaehyun Kim, Seoul (KR); Taehyeon Kim, Seoul (KR); Hyunsook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 19 days.

(21) Appl. No.: 14/786,014

(22) PCT Filed: Apr. 23, 2014

(86) PCT No.: PCT/KR2014/003548
§ 371 (c)(1),
(2) Date: Oct. 21, 2015

(87) PCT Pub. No.: WO2014/178561
PCT Pub. Date: Nov. 6, 2014

(65) Prior Publication Data
US 2016/0073236 A1    Mar. 10, 2016

Related U.S. Application Data

(60) Provisional application No. 61/816,810, filed on Apr. 29, 2013, provisional application No. 61/924,241, filed on Jan. 7, 2014.

(51) Int. Cl.
*H04W 4/02*  (2018.01)
*H04W 8/02*  (2009.01)
(Continued)

(52) U.S. Cl.
CPC ............ *H04W 4/023* (2013.01); *H04L 67/18* (2013.01); *H04W 8/02* (2013.01); *H04W 64/00* (2013.01);
(Continued)

(58) Field of Classification Search
None
See application file for complete search history.

(56) References Cited

U.S. PATENT DOCUMENTS

2009/0042587 A1    2/2009  Kamdar et al.
2011/0269455 A1   11/2011  Edwards et al.
(Continued)

OTHER PUBLICATIONS

PCT International Application No. PCT/KR2014/003548, Written Opinion of the International Authority dated Aug. 19, 2014, 21 pages.

*Primary Examiner* — Brandon M Renner
(74) *Attorney, Agent, or Firm* — Lee, Hong, Degerman, Kang & Waimey

(57) ABSTRACT

The present invention relates to a method and an apparatus for supporting a proximity service (ProSe) of a first network entity in a wireless communication system. More particularly, the present invention comprises the steps of: a first network entity receiving a request for location information related to a first terminal; transmitting a paging message to the first terminal when the first terminal is in an idle state; receiving a first response message corresponding to the paging message; and transmitting a second response message corresponding to a service request on the basis of the first response message.

10 Claims, 5 Drawing Sheets

(51) Int. Cl.
*H04W 64/00* (2009.01)
*H04L 29/08* (2006.01)
*H04W 68/00* (2009.01)
*H04W 48/16* (2009.01)

(52) U.S. Cl.
CPC ............ *H04W 68/005* (2013.01); *H04W 4/02* (2013.01); *H04W 48/16* (2013.01)

(56) References Cited

U.S. PATENT DOCUMENTS

| | | |
|---|---|---|
| 2012/0196599 A1 | 8/2012 | Cho et al. |
| 2013/0065619 A1 | 3/2013 | Chen et al. |
| 2013/0083726 A1 | 4/2013 | Jain et al. |
| 2013/0303088 A1* | 11/2013 | Watfa ................. H04W 4/008 455/41.2 |
| 2014/0016614 A1* | 1/2014 | Velev ................. H04W 4/005 370/331 |
| 2014/0105028 A1* | 4/2014 | Bhaskaran ............ H04W 48/18 370/242 |
| 2014/0256365 A1* | 9/2014 | Schmidt ................ H04W 4/12 455/466 |
| 2015/0103766 A1* | 4/2015 | Miklos ................ H04W 72/042 370/329 |

\* cited by examiner (a)

(b)

METHOD AND APPARATUS FOR SEARCHING FOR PROXIMITY SERVICE SO AS TO PROVIDE PROXIMITY SERVICE

CROSS-REFERENCE TO RELATED APPLICATIONS

This application is the National Stage filing under 35 U.S.C. 371 of International Application No. PCT/KR2014/003548, filed on Apr. 23, 2014, which claims the benefit of U.S. Provisional Application Nos. 61/816,810, filed on Apr. 29, 2013 and 61/924,241, filed on Jan. 7, 2014, the contents of which are all hereby incorporated by reference herein in their entirety.

TECHNICAL FIELD

The present invention relates to a wireless communication system and, more specifically, to a proximity service discovery method and apparatus for providing proximity services.

BACKGROUND ART

A Proximity Service (ProSe) refers to a scheme that supports communication between devices located physically close to each other. Specifically, ProSe is aimed to discover an application operating in devices that are in proximity to each other and ultimately to support an operation of exchanging application-related data. For example, it may be considered that ProSe is applied to applications such as Social Network Services (SNS), commerce, and games.

ProSe may also be called Device-to-Device (D2D) communication. That is, ProSe refers to a communication scheme for establishing a direct link between a plurality of devices (e.g., User Equipments (UEs)) and thus directly exchanging user data (e.g., voice or multimedia data) between the devices without passing through a network. ProSe communication may include UE-to-UE communication, peer-to-peer communication, etc. In addition, the ProSe communication scheme may be applied to Machine-to-Machine (M2M) communication, Machine Type Communication (MTC), etc. Therefore, ProSe is being considered as one solution to burden of an eNodeB due to rapidly increase in data traffic. By introducing ProSe, effects such as reduction in the number of procedures of the eNodeB, decrease in power consumption of devices that participate in ProSe, increase in data transmission rate, increase in network accommodation capacity, load distribution, cell coverage expansion, etc. can be expected.

DISCLOSURE

Technical Problem

While the necessity of introduction of ProSe is under discussion, a specific plan for a mechanism for supporting and controlling ProSe is not provided.

An object of the present invention is to provide an EPC-level ProSe discovery method for obtaining location information from terminals in connection with a ProSe based communication mechanism.

The technical problems solved by the present invention are not limited to the above technical problems and those skilled in the art may understand other technical problems from the following description.

Technical Solution

In an aspect of the present invention, a method for supporting proximity services (ProSe) of a first network entity in a wireless communication system includes: a first network entity receiving a location information request related to a first terminal; a first network entity transmitting a paging message to the first terminal when the first terminal is in an idle state; the first network entity receiving a first response message corresponding to the paging message; and the first network entity transmitting a second response message corresponding to the service request on the basis of the first response message.

The first network entity may be configured not to perform a procedure for packet services when performing paging for a terminal in an idle state.

The paging message may define at least one of whether location information is requested, type of requested location information, whether a service request procedure of the first terminal is performed, whether to perform ProSe discovery, whether ProSe is related and whether a response message of the first terminal needs to include location information.

The first network entity may be a mobility management entity (MME).

The location information request may be received from a second network entity or a second terminal, wherein the second network entity is one of another MME, a server for ProSe, an eNodeB and a GMLC (Gateway Mobile Location Center).

The first response message may be a NAS (Non-Access Stratum) message or an AS (Access Stratum) message.

The first response message may include information indicating that the first response message is a response message to the location information request.

The method may further include performing RRC connection release when RRC connection is established.

The second response message may include location information included in the first response message.

The second response message may include information indicating that the location information request has failed, when the first response message is not received.

In another aspect of the present invention, provided herein is a first network entity supporting ProSe in a wireless communication system, including: a radio frequency unit; and a processor, wherein the processor is configured to receive a location information request related to a first terminal, to transmit a paging message to the first terminal when the first terminal is in an idle state, to receive a first response message in response to the paging message and to transmit a second response message corresponding to the service request on the basis of the first response message.

Advantageous Effects

According to the present invention, it is possible to perform efficient communication by obtaining correct location information from terminals and performing EPC-level ProSe discovery.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
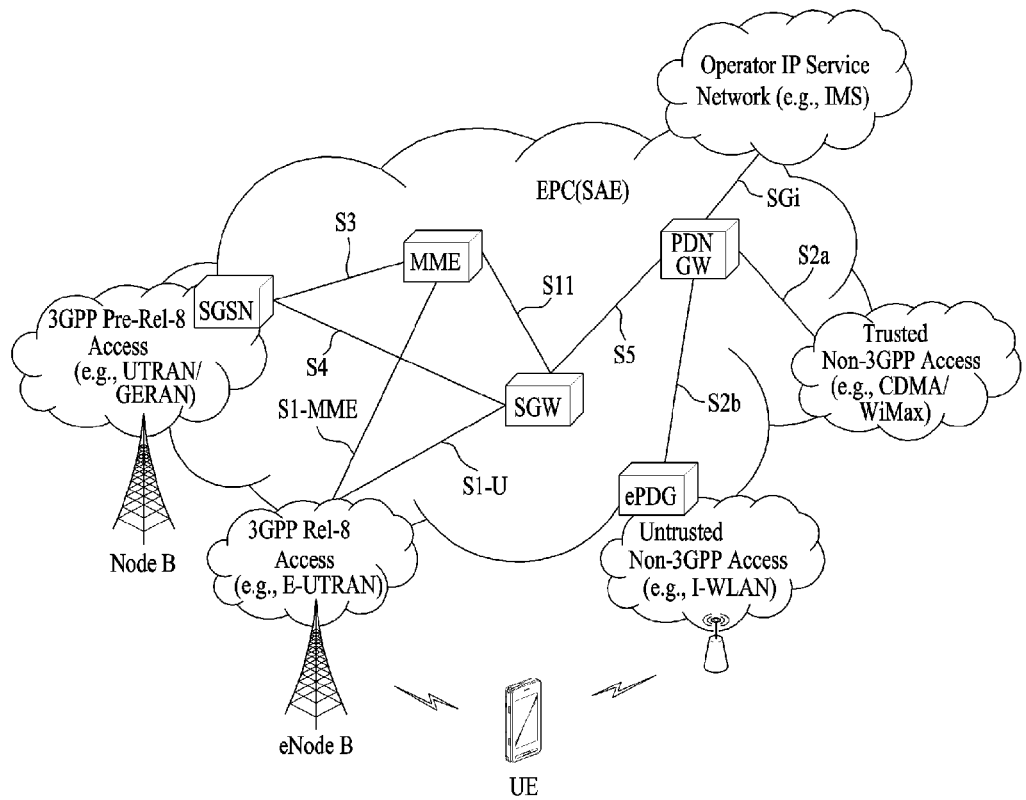
FIG. 1 is a view schematically illustrating the architecture of an Evolved Packet System (EPS) including an Evolved Packet Core (EPC)

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

Specific terms used for the embodiments of the present invention are provided to aid in understanding the present invention. These specific terms may be replaced with other terms within the scope and spirit of the present invention.

In some instances, known structures and devices are omitted, or are shown in block diagram form focusing on important features of the structures and devices, so as not to obscure the concept of the present invention. The same reference numbers will be used throughout this specification to refer to the same or like parts.

The embodiments of the present invention can be supported by standard documents disclosed for at least one of wireless access systems, including Institute of Electrical and Electronics Engineers (IEEE) 802, 3GPP, 3GPP LTE, LTE-A and 3GPP2. Steps or parts that are not described to clarify the technical features of the present invention can be supported by those documents. Further, all terms as set forth herein can be explained by the standard documents.

The following features can be used for various wireless communication systems. For clarity, this application focuses on 3GPP LTE and 3GPP LTE-A. However, the technical features of the present invention are not limited thereto.

Terms used in the specification are defined as follows.

UMTS (Universal Mobile Telecommunications System): GSM (Global System for Mobile Communication) based third-generation mobile communication technology developed by 3GPP.

EPS (Evolved Packet System): a network system composed of an EPC (Evolved Packet Core), which is an IP based packet switched core network, and an access network such as LTE and UTRAN. The EPS is a network evolved from UMTS.

NodeB: a base station of GERAN/UTRAN. The NodeB is installed outdoors and has a macro cell scale coverage.

eNodeB: an LTE base station which is installed outdoors and has a macro cell scale coverage.

UE (User Equipment): a user device. The UE may be called a terminal, an ME (Mobile Equipment), an MS (Mobile Station) and the like. In addition, the UE may be a portable device such as a notebook computer, a cellular phone, a PDA (Personal Digital Assistant), a smartphone and a multimedia device or a fixed device such as a PC (Personal Computer) and a vehicle-mounted device. The UE can perform communication through a 3GPP spectrum such as LTE and/or a non-3GPP spectrum such as Wi-Fi and a spectrum for public safety.

Proximity services or proximity-based services (ProSe): services enabling discovery between devices in physical proximity to each other and communication through direct communication/communication through a base station/communication through a third device. Here, user plane data is exchanged through a direct data path or a direct mode data path without passing through a 3GPP core network (e.g., EPC). ProSe is referred to as D2D (Device-to-Device) services.

Proximity: Whether a UE is in proximity to another UE is determined according to whether predetermined proximity standards are satisfied. Different proximity standards may be provided for ProSe discovery and ProSe communication. Furthermore, the proximity standards may be set as a control target of an operator.

ProSe discovery: a process of identifying a UE approaching another UE using E-UTRA.

ProSe communication: communication between UEs in proximity by mans of a communication path established between the UEs. The communication path may be directly established between the UEs or routed through local eNodeBs.

ProSe-enabled UE: a UE supporting ProSe discovery and/or ProSe communication. The ProSe-enabled UE is referred to as a UE in the following description.

ProSe-enabled network: a network supporting ProSe discovery and/or ProSe communication. The ProSe-enabled network is referred to as a network in the following description.

ProSe E-UTRA communication: ProSe communication using a ProSe E-UTRA communication path.

ProSe-assisted WLAN direct communication: ProSe communication using a ProSe-assisted WLAN direct communication path. The ProSe-assisted WLAN direct communication may be referred to as EPC-assisted WLAN direct communication.

ProSe group communication: a method of establishing a common communication path between ProSe-enabled UEs and which refers to one-to-many ProSe communication between two or more ProSe-enabled UEs adjacent to each other.

ProSe broadcast communication: a method of establishing a common communication path between ProSe-enabled UEs and which refers to one-to-all ProSe communication between two or more ProSe-enabled UEs adjacent to each other.

ProSe UE-to-network relay: a ProSe-enabled public safety UE in the form of a relay operating as a communication relay between a ProSe-enabled public safety UE and a ProSe-enabled network using E-UTRA.

ProSe UE-to-UE relay: a ProSe-enabled public safety UE in the form of a relay operating as a ProSe communication relay between ProSe-enabled public safety UEs.

RAN (Radio Access Network): a unit including a NodeB, an eNodeB and an RNC (Radio Network Controller) for controlling the NodeB and eNodeB in a 3GPP network. The RAN is present between a UE and a core network and provides connection to the core network.

HLR (Home Location Register)/HSS (Home Subscriber Server): a database having subscriber information in a 3GPP network. The HSS can execute configuration storage, identity management, user status storage functions and the like.

RANAP (RAN Application Part): an interface between nodes (MME (Mobility Management Entity)/SGSN (Serving GPRS (General Packet Radio Service) supporting Node)/MSC (Mobile Switching Center)) which control the RAN and the core network.

PLMN (Public Land Mobile Network): a network configured for the purpose of providing mobile communication services to individuals. The PLMN can be configured per operator.

NAS (Non-Access Stratum): a functional layer for exchanging signaling and traffic messages between a UE and a core network in the UMTS protocol stack. The NAS has main functions of supporting UE mobility and supporting a session management procedure for establishing and maintaining IP connection between a UE and a PDN GW (Packet Data Network Gateway).

HNB (Home NodeB): CPE (Customer Premises Equipment) which provides UTRAN (UMTS Terrestrial Radio Access Network) coverage. Refer to standard document TS 25.467 for details.

HeNodeB (Home eNodeB): CPE (Customer Premises Equipment) which provides E-UTRAN (Evolved-UTRAN) coverage. Refer to standard document TS 36.300 for details.

CSG (Closed Subscriber Group): a subscriber group permitted to access one or more CSG cells in a PLMN (Public Land Mobile Network) as a member of a CSG of an H(e)NB.

LIPA (Local IP Access): access by an IP capable UE to a different IP capable entity present in the same residential/enterprise IP network via an H(e)NB. LIPA traffic does not pass through an operator network. 3GPP release-10 provides access to resources on a local network (i.e., network located in the house or company of a customer) via an H(e)NB.

SIPTO (Selected IP Traffic Offload): 3GPP release-10 supports transmission of user traffic by an operator by selecting a PGW (Packet data network GateWay) in proximity to a UE in an EPC network.

PDN (Packet Data Network) connection: logical connection between a UE represented by one IP address (one IPv4 address and/or one IPv6 prefix) and a PDN represented by an APN (Access Point Name).

EPC (Evolved Packet Core)

FIG. 1 is a view schematically illustrating the architecture of an Evolved Packet System (EPS) including an Evolved Packet Core (EPC).

The EPC is a core element of System Architecture Evolution (SAE) for improving the performance of 3GPP technology. SAE corresponds to a study item for deciding a network structure supporting mobility among various types of network. SAE aims to provide, for example, an optimized packet-based system which supports various radio access technologies based on IP and provides improved data transfer capabilities.

Specifically, the EPC is a core network of an IP mobile communication system for a 3GPP LTE system and may support packet-based real-time and non-real-time services. In a legacy mobile communication system (e.g., 2nd or 3rd generation mobile communication system), a core network function is implemented through two separated sub-domains, e.g., circuit-switched (CS) sub-domain for sound and packet-switched (PS) sub-domain for data. However, in a 3GPP LTE system which is evolved from the 3rd generation communication system, the CS and PS sub-domains are unified into a single IP domain. For example, in the 3GPP LTE system, IP-capable UEs can be connected via an IP-based base station (e.g., eNodeB (evolved Node B)), an EPC, an application domain (e.g., IMS (IP Multimedia Subsystem)). That is, the EPC is a structure inevitably required to implement end-to-end IP service.

The EPC may include various components and FIG. 1 illustrates a few of the components, e.g., Serving GateWay (SGW), Packet Data Network GateWay (PDN GW), Mobility Management Entity (MME), Serving GPRS (General Packet Radio Service) Supporting Node (SGSN), and enhanced Packet Data Gateway (ePDG).

The SGW operates as a boundary point between a Radio Access Network (RAN) and a core network and is an element which performs a function for maintaining a data path between an eNodeB and a PDG GW. In addition, if a UE moves across an area served by an eNodeB, the SGW serves as a local mobility anchor point. That is, packets may be routed via the SGW for mobility in an Evolved-UMTS (Universal Mobile Telecommunications System) Terrestrial Radio Access Network (E-UTRAN) defined after 3GPP Release-8. Further, the SGW may serve as an anchor point for mobility management with another 3GPP network such as RAN defined before 3GPP Release-8, e.g., UTRAN or GSM (Global System for Mobile communication)/EDGE (Enhanced Data rates for GSM Evolution) Radio Access Network (GERAN).

The PDN GW (or P-GW) corresponds to a termination point of a data interface directed to a packet data network. The PDN GW may support policy enforcement features, packet filtering and charging support. In addition, the PDN GW may serve as an anchor point for mobility management with a 3GPP network and a non-3GPP network (e.g., untrusted network such as Interworking Wireless Local Area Network (I-WLAN) and trusted network such as Code Division Multiple Access (CDMA) or WiMax).

Although the SGW and the PDN GW are configured as separate gateways in the network architecture of FIG. 1, the two gateways may be implemented according to a single gateway configuration option.

The MME performs signaling and control functions to support access of a UE for network connection, network resource allocation, tracking, paging, roaming and handover. The MME controls control plane functions related to subscriber and session management. The MME manages a large number of eNodeBs and performs signaling for selection of a typical gateway for handover to another 2G/3G network. In addition, the MME performs security procedures, terminal-to-network session handling, idle terminal location management, etc.

The SGSN handles all packet data such as mobility management and authentication of a user for another 3GPP network (e.g., GPRS network).

The ePDG serves as a security node for an untrusted non-3GPP network (e.g., I-WLAN, Wi-Fi hotspot, etc.).

As described above in relation to FIG. 1, an IP-capable UE may access an IP service network (e.g., IMS) provided by an operator, via various elements in the EPC based on non-3GPP access as well as 3GPP access.

FIG. 1 also illustrates various reference points (e.g., S1-U, S1-MME, etc.). In the 3GPP system, a conceptual link connecting two functions of different functional entities of E-UTRAN and EPC is defined as a reference point. Table 1 lists the reference points illustrated in FIG. 1. In addition to the examples of Table 1, various reference points may be present according to network architectures.

TABLE 1

| Reference Point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points illustrated in FIG. 1, S2a and S2b correspond to non-3GPP interfaces. S2a is a reference point for providing a user plane with related control and mobility support between the trusted non-3GPP access and the PDNGW. S2b is a reference point for providing a user plane with related control and mobility support between the ePDG and the PDNGW.

Control Mechanism for Providing Proximity Service (ProSe)

The present invention proposes a control mechanism for supporting ProSe or a D2D service in a mobile communication system such as a 3GPP EPS.

Due to increase in user demands related to SNS, etc., demand for detection/discovery and special applications/services (e.g., proximity-based applications/services), between physically adjacent users/devices, has arisen. To provide such services even in a 3GPP mobile communication system, potential use cases and scenarios of the ProSe and potential service requirements are under discussion.

The potential use cases of the ProSe may include a commercial/social service, network offloading, public safety, and integration of current infrastructure services (to assure the consistency of user experience including reachability and mobility aspects). In addition, use cases and potential requirements for public safety in the case of absence of E-UTRAN coverage (in this case, limiting the use cases to specific frequency bands and specific terminals that are designated for public safety under the condition that specific regional regulation and operator policy are satisfied, should be considered) are under discussion.

In particular, the scope of discussion of the ProSe that is underway in 3GPP assumes that the proximity-based applications/services are provided via LTE or a WLAN and that discovery and communication are performed between devices under the control of an operator/network.

Figure 2:
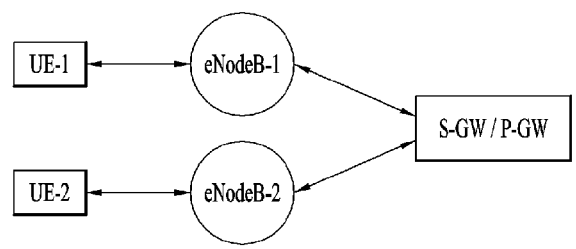
FIG. 2 is a view illustrating a default data path for communication between two UEs in an EPS.

FIG. 2 is a view illustrating a default data path for communication between two UEs in an EPS. That is, FIG. 2 illustrates an exemplary data path between UE-1 and UE-2 in a general case in which ProSe between UE-1 and UE-2 is not applied. This default path passes through a base station (e.g., an eNodeB or HeNodeB) and gateway nodes (e.g., an EPC or operator network). For example, as illustrated in FIG. 2, when UE-1 and UE-2 exchange data, data from UE-1 may be transmitted to UE-2 via eNodeB-1, an S-GW/P-GW, and eNodeB-2 and, likewise, data from UE-2 may be transmitted to UE-1 via eNodeB-2, an S-GW/P-GW, and eNodeB-1. Although UE-1 and UE-2 are camping on different eNodeBs in FIG. 2, UE-1 and UE-2 may camp on the same eNodeB. In addition, although the two UEs are served by the same S-GW and P-GW in FIG. 2, various combinations of services are allowed. For example, the UEs may be served by the same S-GW and different P-GWs, by different S-GWs and the same P-GW, or by different S-GWs and different P-GWs.

In the present invention, this default data path may be referred to as an infrastructure path, infrastructure data path, or infrastructure communication path. In addition, communication through the infrastructure data path may be referred to as infrastructure communication.

Figure 3:
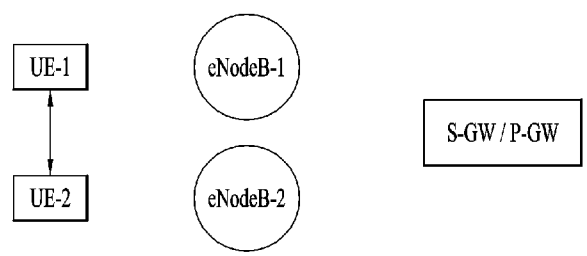
FIG. 3 is a view illustrating a direct mode data path between two UEs based on ProSe.
Figure 3:
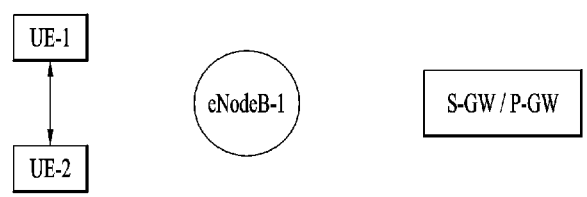

FIG. 3 is a view illustrating a direct mode data path between two UEs based on ProSe. This direct mode communication path does not pass via a base station (e.g., an eNodeB or HeNodeB) and gateway nodes (e.g., an EPC).

FIG. 3(a) illustrates an exemplary case in which UE-1 and UE-2 are camping on different eNodeBs (e.g., eNodeB-1 and eNodeB-2) and exchange data via a direct mode communication path. FIG. 3(b) illustrates an exemplary case in which UE-1 and UE-2 are camping on the same eNodeB (e.g., eNodeB-1) and exchange data via a direct mode communication path.

Meanwhile, it should be noted that a data path of a user plane is directly established between UEs without passing through an eNodeB or a gateway node as illustrated in FIG. 3 but a control plane path may be established via an eNodeB and a core network. Control information exchanged through the control plane path may be information about session management, authentication, authorization, security, billing, etc. In the case of ProSe communication between UEs served by different eNodeBs as illustrated in FIG. 3(a), control information for UE-1 may be exchanged via eNodeB-1 with a control node (e.g., an MME) of a core network and control information for UE-2 may be exchanged via eNodeB-2 with a control node (e.g., an MME) of a core network. In the case of ProSe communication between UEs served by the same eNodeB as illustrated in FIG. 3(b), control information for UE-1 and UE-2 may be exchanged via eNodeB-1 with a control node (e.g., an MME) of a core network.

Figure 4:
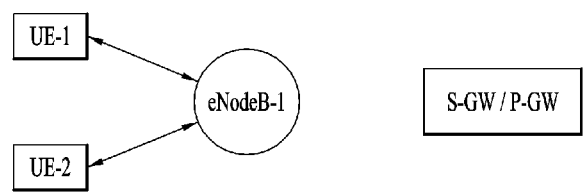
FIG. 4 is a view illustrating a locally-routed data path between two UEs based on ProSe.

FIG. 4 is a view illustrating a locally routed data path between two UEs based on ProSe. As illustrated in FIG. 4, a ProSe communication data path between UE-1 and UE-2 is established via eNodeB-1 but does not pass through a gateway node (e.g., an EPC) operated by an operator. For a control plane path, if a locally routed data path is established between UEs served by the same eNodeB as illustrated in FIG. 4, control information for UE-1 and UE-2 may be exchanged via eNodeB-1 with a control node (e.g., an MME) of a core network.

In the present invention, the communication path described above in relation to FIGS. 3 and 4 may be referred to as a direct data path, a data path for ProSe, a ProSe-based data path, or a ProSe communication path. In addition, communication through this direct data path may be referred to as direct communication, ProSe communication, or ProSe-based communication.

For ProSe, a procedure for discovering a UE in proximity to the corresponding UE using E-UTRA may be required. This procedure is referred to as ProSe discovery. Referring to service requirements for proximity services, defined in LTE standard document 3GPP TS 22.278, ProSe discovery may be performed through a direct radio signal between UEs or through an operator network.

For example, "7A.1 General Requirements for Proximity Services" of 3GPP TS 22.278 describes that a plurality of ProSe-enabled UEs can be determined on the basis of a mobile communication carrier policy and user selection, for example, two UEs for ProSe can be determined through a direct radio signal or a mobile operator network. However, with respect to ProSe discovery through the mobile operator network, 3GPP TR 23.703, which is another LTE standard document, describes that EPC-level ProSe discovery is a procedure of determining proximity of a plurality of ProSe-enabled UEs and notifying the plurality of UEs of ProSe but does not define a specific plan therefor.

More specifically, for EPC-level ProSe discovery, the correct most recent location information about a discoveree UE needs to be obtained from a discoverer UE. This is because location information about a UE, stored in the corresponding network, may be information which is not correct to detect the location of the UE due to movement of the UE or RAT change (e.g., change from an E-UTRAN to a UTRAN/GERAN). Accordingly, to solve this problem, the present invention proposes an EPC-level ProSe discovery method for obtaining location information from a UE in a timely manner.

1. EPC-level ProSe Discovery

The present invention proposes a ProSe discovery method for efficiently providing proximity based services in a mobile communication system such as 3GPP EPS (Evolved Packet System). A ProSe discovery mechanism provided by the present invention can be composed of 1) operation of an MME to perform paging to obtain location information from a UE (referred to as a first UE hereinafter), 2) operation of the MME to receive, from the UE, a response message to a paging message transmitted to the UE from the MME and 3) operation of the MME to transmit the received response message to another network node/UE (referred to as a second UE hereinafter). Operations 1, 2 and 3 provided by the present invention will now be described in detail.

1-1. Paging Operation of MME to Obtain Location Information

According to the present invention, when the MME receives a location information request with respect to a UE (i.e., a first UE) which is served by the MME, the MME can perform paging in order to obtain location information from the first UE if the first UE is in an idle state.

When the MME transmits a paging message, the paging message can include one or more of pieces of information a) to e) described below. The paging message may include the information explicitly or implicitly. To include the information in the paging message, an existing information element of the paging message may be used (e.g., a new value is defined for the existing information element) or a new information element may be defined. Alternatively, a new paging message, instead of the conventional paging message, may be defined and used.

a) Information indicating that paging is for requesting location b) Type of requested location information: for example, ECGI (E-UTRAN Cell Global Identifier), coordinate information, geographic location, information related to movement of the UE (e.g, velocity) and the like c) Service request procedure of the UE, that is, information for instructing the UE not to transmit a service request message or an extended service request message to the MME d) Information indicating that paging is related to ProSe discovery and/or ProSe e) Information indicating whether the UE needs to include location information in a response to paging Accordingly, the MME may include the aforementioned information (i.e., a to e) in the conventional paging message and transmit the paging message to the UE or transmit a message newly defined to be used to request the UE to provide location information or for ProSe discovery or a conventional NAS message (extended according to the present invention) to the UE.

The location information request received by the MME can be received from another network node or another UE (i.e., second UE). Here, the other network node can be various nodes such as another MME, an HSS, a server for ProSe (e.g., ProSe server or a ProSe function), an eNodeB and an LCS (Location Service) related node such as a GMLC (Gateway Mobile Location Center), which can be applied to embodiments of the present invention.

The paging message transmitted by the MME for paging is defined in "PAGING" in section 9.1.6 of 3GPP TS 36.413, which is shown in Tables 2 and 3.

TABLE 2

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| UE Identity Index value | M | | 9.2.3.10 | | YES | ignore |
| UE Paging Identity | M | | 9.2.3.13 | | YES | ignore |
| Paging DRX | O | | 9.2.1.16 | | YES | ignore |
| CN Domain | M | | 9.2.3.22 | | YES | ignore |
| List of TAIs | | 1 | | | YES | ignore |
| >TAI List Item | | 1 . . . <maxnoofTAIs> | | | EACH | ignore |
| >>TAI | M | | 9.2.3.16 | | — | |
| CSG Id List | | 0 . . . 1 | | | GLOBAL | ignore |
| >CSG Id | | 1 . . . <maxnoofCSGId> | 9.2.1.62 | | — | |
| Paging Priority | O | | 9.2.1.78 | | YES | ignore |

TABLE 3

| Range bound | Explanation |
| --- | --- |
| maxnoofTAIs | Maximum no. of TAIs. Value is 256. |
| maxnoofCSGIds | Maximum no. of CSG Ids within the CSG Id List. Value is 256. |

The paging message transmitted from the MME to the UE is delivered to the UE via eNodeB(s) (refer to paging defined in "Message definitions" of section 6.2.2 of 3GPP TS 36.331 for details). The additional information (a to e) proposed by the present invention can be directly or indirectly defined in a paging message transmitted from the eNodeB to the UE (paging defined in "Message definitions" of section 6.2.2 of 3GPP TS 36.331) as well as Tables 2 and 3.

1-2. Operation of MME to Receive Response Message from First UE

Upon reception of the paging message transmitted from the MME, the UE transmits a NAS message in response to the paging message to the MME. Here, i) a conventional service request message or extended service request message, ii) another conventional NAS message (e.g., TAU request or the like) or an extension thereof or iii) a message newly defined for the present invention may be used as the NAS message. The UE may transmit an access stratum (AS) message to the eNodeB in order to respond to paging upon reception of the paging message. In this case, the AS message may be a conventional AS message or a newly defined AS message.

For reference, when the UE performs a service request procedure upon reception of the paging message (that is, the UE transmits the service request message or extended service request message to the MME) in conventional wireless communication systems (i.e., wireless communication system prior to 3GPP release-11), radio bearers and S1 bearers for packet services as well as NAS signaling connection are established. In the present invention, however, the radio bearers and the S1 bearers for packet services need not be generated in the case of paging for obtaining the location information from the UE (refer to the aforementioned operation 1-1). Accordingly, the UE (i.e., first UE) may not consider generation of the radio bearers and the S1 bearers for packet services even if the UE uses the service request message or extended service request message in order to provide the location information to the MME.

That is, the UE (i.e., first UE) can include appropriate location information in the response message to the paging message as necessary on the basis of the information (e.g., the type of requested location information (i.e., b of operation 1-1) and/or configuration information) included in the paging message during transmission of the response message to the paging message to the network (MME or eNodeB). In addition, the response message to the paging message may additionally include information indicating that the response message is a response to the location information request explicitly or implicitly.

Furthermore, the UE (i.e., first UE) may additionally perform radio resource control (RRC) connection release operation after transmission of the response message to the paging message to the MME. Alternatively, upon reception of the message transmitted from the UE (i.e., first UE) to the MME, the eNodeB may additionally perform RRC connection release/S1-AP (i.e., S1-MME) release operation while forwarding the message to the MME.

1-3. Operation of MME to Receive Response Message from First UE

Upon reception of the response message to the paging message from the UE as in operation 1-2, the MME transmits a response message including location information to the other network node or UE (i.e., second UE) which requests the location information. Here, the location information included in the response message (forwarded to the other network node or the second UE) may be i) location information obtained from the UE, ii) a modification of the location information obtained from the UE, iii) location information generated by the MME on the basis of the location information obtained from the UE, iv) information related to the location of the UE, provided by the eNodeB (e.g., TAI, ECGI and the like) and/or v) additional location related information.

If the MME does not receive the response message (i.e., message providing the location information) to paging from the UE (i.e., first UE), the MME may transmit, to the other network node or UE (i.e. second UE), a response message indicating that the location information request has failed or a response message indicating that the location information is unavailable.

Upon reception of the response message to paging from the UE, the MME may additionally consider or perform the following.

The MME does not generate radio bearers and S1 bearers for packet services. This is also applied to a case in which the UE (i.e., first UE) uses the service request message or extended service request message in the aforementioned operation 1-2.

Accordingly, if the MME generates the radio bearers and the S1 bearers for packet services according to the conventional service request procedure, the MME releases the radio bearers and the S1 bearers after generation.

S1-AP (i.e., S1 signaling connection with the eNodeB) release operation

The aforementioned embodiments of the present invention can be applied to not only operation of discovering one UE but also operation of discovering a plurality of UEs (e.g., UEs belonging to a group).

In addition, the present invention can be applied to UMTS/EPS mobile communication systems including 3GPP access networks (e.g., UTRAN/GERAN/E-UTRAN) and non-3GPP access networks (e.g., WLAN and the like) as well as LTE/EPC networks. Furthermore, the present invention can be applied to all wireless mobile communication systems in environments in which network control is applied.

2-1. First Embodiment According to the Present Invention

Figure 5:
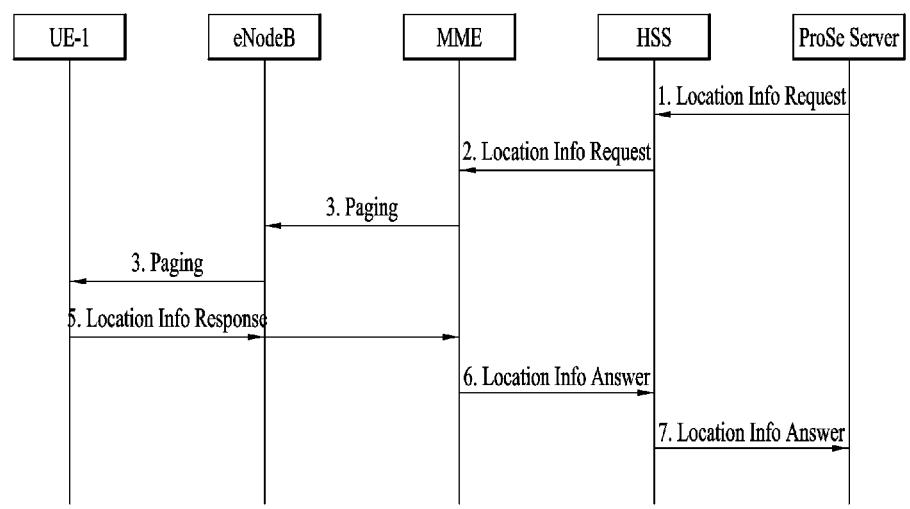
FIGS. 5 and 6 are reference views illustrating EPC-level proximity service discovery according to a first embodiment based on a first scheme of the present invention.

FIG. 5 is a reference view illustrating a paging operation for requesting location information according to the first embodiment of the present invention.

In step 1 of FIG. 5, a ProSe server sends a request message for requesting location information of UE-1, for example, a Location Info Request message, to an HSS. When an interface between the ProSe server and an MME is present, the ProSe server may transmit the location information request message to the MME which serves UE-1.

In step 2 of FIG. 5, the HSS transmits a location information request message, for example, a Location Info Request message, to the MME which serves UE-1.

In step 3 of FIG. 5, the MME performs paging for UE-1. The paging operation has been described in the aforementioned operation 1-1 and thus detailed description thereof is omitted.

In step 4 of FIG. 5, upon reception of a paging message from the MME, an eNodeB pages UE-1 on the basis of the received paging message.

In step 5 of FIG. 5, upon reception of the paging message, UE-1 transmits a response message (e.g., message including location information) to the paging message, for example, a Location Info Response message. The paging operation has been described in the aforementioned operation 1-2 and thus detailed description thereof is omitted.

In step 6 of FIG. 5, the MME forwards a response message including the location information of UE-1, for example, a Location Info Answer message, to the HSS. The operation of forwarding the response message has been described in the aforementioned operation 1-3 and thus detailed description thereof is omitted. When the ProSe server sends the message for requesting the location information of UE-1 to the MME in step 1 of FIG. 5, the MME can transmit a response message to the ProSe server.

In step 7 of FIG. 5, the HSS transmits a response message including the location information of UE-1, for example, a Location Info Answer message, to the ProSe server.

2-2. Second Embodiment According to the Present Invention

Figure 6:
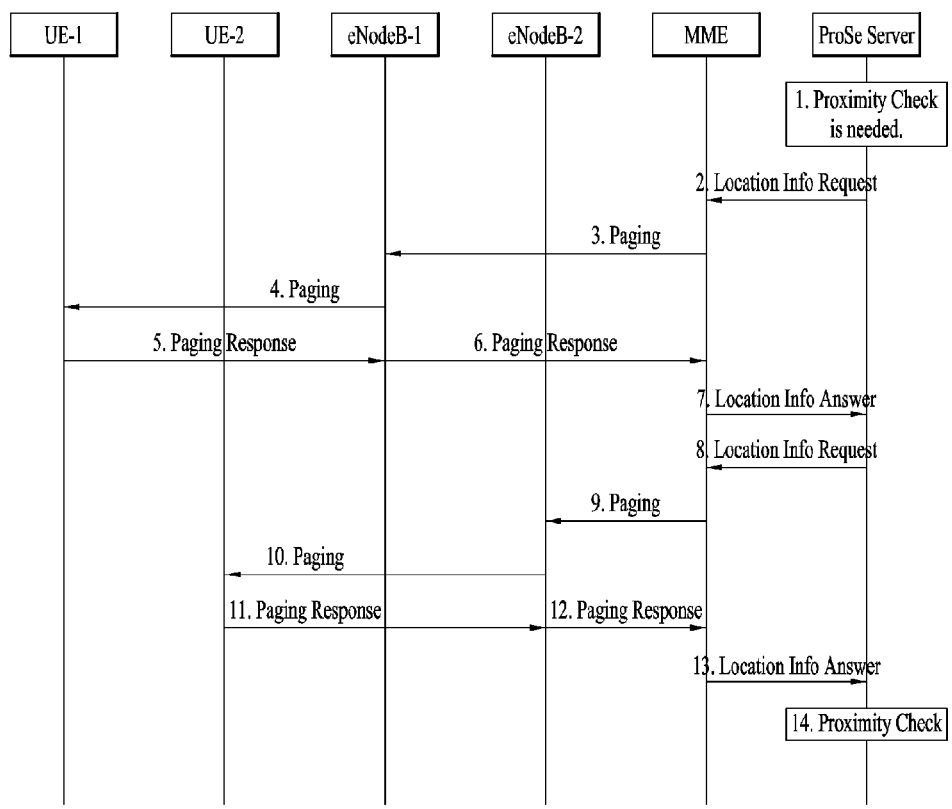

FIG. 6 is a reference view illustrating a paging operation for requesting location information and EPC-level ProSe discovery operation according to the second embodiment of the present invention.

In step 1 of FIG. 6, a ProSe server needs to determine/check whether UE-1/user of UE-1/application of UE1 and UE-2/user of UE-2/application of UE-2 are i) in a proximity relation, ii) in proximity to each other, iii) within proximity or iv) discoverable each other. This operation can be based on various causes/triggers, such as i) recognition of necessity of proximity check due to a request from UE-1 (or user of UE-1/application of UE-1) and/or UE-2 (or user of UE-2/application of UE-2), ii) recognition of necessity of proximity check due to information/request from an application server related to the application (i.e., application of UE-1 or UE-2) and iii) recognition of necessity of proximity check according to configuration/information in the ProSe server.

In step 2 of FIG. 6, the ProSe server sends a request message for requesting location information of UE-1, for example, a Location Info Request message, to an MME which servers UE-1. Here, the ProSe server may make the location information request through an HSS.

In step 3 of FIG. 6, the MME performs paging for UE-1. The paging operation has been described in the aforementioned operation 1-1 and thus detailed description thereof is omitted.

In step 4 of FIG. 6, upon reception of a paging message from the MME, an eNodeB (eNodeB-1 in FIG. 6) pages UE-1 on the basis of the received paging message. Alternatively, eNodeB-1 may check information described in the aforementioned operation 1-1, which has been added to the paging message by the MME, remove the information from the paging message and then send the paging message to UE-1.

In step 5 of FIG. 6, upon reception of the paging message, UE-1 transmits a response message to the paging message, that is, a Paging Response message, to the network. This operation has been described in the aforementioned operation 1-2 and thus detailed description thereof is omitted. In the present embodiment, it is assumed that UE-1 does not include the location information thereof in the paging response message.

In step 6 of FIG. 6, eNodeB-1 includes the location information (e.g., tracking area ID and/or ECGI information) of UE-1 in the paging response message received from UE-1 and forwards the paging response message to the MME. When sending the message about the UE to the MME, eNodeB-1 may i) include the location information in the message all the time or ii) include the location information in the message upon recognizing that the location information needs to be included in the message. For example, in the case of ii), eNodeB-1 can include the location information in the message on the basis of explicit/implicit information included in the paging message received in step 3 or include the location information in the message on the basis of explicit/implicit information included in the paging response message received in step 5.

In step 7 of FIG. 6, the MME sends a response message including the location information of UE-1, for example, a Location Info Answer message, to the ProSe server.

In FIG. 8, the ProSe server transmits a message for requesting location information of UE-2, for example, a Location Info Request message, to the MME which servers UE-2. Here, the ProSe server may make the location information request through an HSS.

In step 9 of FIG. 6, the MME performs paging for UE-2. The paging operation has been described in the aforementioned operation 1-1 and thus detailed description thereof is omitted.

In step 10 of FIG. 6, upon reception of a paging message from the MME, an eNodeB (eNodeB-2 in FIG. 6) pages UE-2 on the basis of the received paging message. Alternatively, eNodeB-2 may check information described in the aforementioned operation 1-1, which has been added to the paging message by the MME, remove the information from the paging message and then send the paging message to UE-2.

In step 11 of FIG. 6, upon reception of the paging message, UE-2 transmits a response message to the paging message, that is, a Paging Response message, to the network. This operation has been described in the aforementioned operation 1-2 and thus detailed description thereof is omitted. In the present embodiment, it is assumed that UE-2 does not include the location information thereof in the paging response message.

In step 12 of FIG. 6, eNodeB-2 includes the location information (e.g., tracking area ID and/or ECGI information) of UE-2 in the paging response message received from UE-1 and forwards the paging response message to the MME. When sending the message about the UE to the MME, eNodeB-2 may i) include the location information in the message all the time or ii) include the location information in the message upon recognizing that the location information needs to be included in the message. That is, eNodeB-2 includes the location information in the message on the basis of explicit/implicit information included in the paging message received in step 9 or includes the location information in the message on the basis of explicit/implicit information included in the paging response message received in step 11. In this manner, eNodeB-2 can include the location information in the message upon recognizing that the location information needs to be included in the message.

In step 13 of FIG. 6, the MME sends a response message including the location information of UE-2, for example, a Location Info Answer message, to the ProSe server.

In step 14 of FIG. 6, upon acquisition of the location information of UE-1 and UE-2, the ProSe server determines/checks whether the two UEs are in proximity to each other.

Upon determining that UE-1 and UE-2 are in proximity to each other, the ProSe server can perform various follow-up operations. For example, the ProSe server can send, to UE-1 or UE-2, a message for notifying UE-1 and/or UE-2 of determination/confirmation of proximity between UE-1 and UE-2.

While FIG. 6 shows a case in which UE-1 and UE-2 are served by the same MME, UE-1 and UE-2 may be respectively served by different MMEs. Furthermore, while FIG. 6 shows a case in which UE-1 and UE-2 are served by different eNodeBs, UE-1 and UE-2 may camp on the same eNodeB.

In FIG. 6, the ProSe server may perform operation (i.e., steps 2 to 13 of FIG. 6) of obtaining the location information of UE-1 and UE-2 periodically and/or repeatedly in order to check/determine proximity between UE-1 and UE-2.

Figure 7:
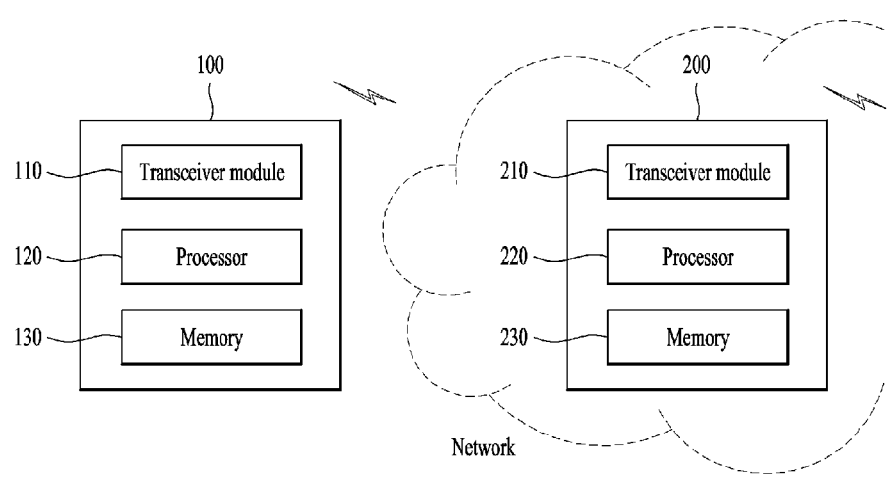
FIG. 7 is a view illustrating the configurations of a UE and a network node device according to a preferred embodiment of the present invention.

FIG. 7 illustrates configurations of a UE and a network node according to a preferred embodiment of the present invention.

Referring to FIG. 7, the UE 100 according to the present invention may include a transceiver module 110, a processor 120 and a memory 130. The transceiver module 110 may be configured to transmit signals, data and information to an external device and to receive signals, data and information from the external device. The UE 100 may be connected to the external device in a wired and/or wireless manner. The processor 120 may control operations of the UE 100 and may be configured to execute a function of processing information and the like to be transmitted/received between the UE 100 and the external device. The memory 130 may store processed information for a predetermined time and may be replaced by a component such as a buffer (not shown).

The UE 100 according to an embodiment of the present invention may be configured to participate in ProSe according to a result of ProSe enablement detection or ProSe UE discovery initiated by a network. The processor 120 of the UE 100 may be configured to transmit ProSe basic information to the network node 200 using the transceiver module 110. The processor 120 may be configured to receive information indicating whether ProSe is permitted from the network node 200 using the transceiver module 110. The processor 120 may be configured to process signaling for setting up a direct data path between the UE 100 and another UE. The processor 120 may be configured to perform direct communication with the other UE using the transceiver module 110. The processor 120 may be configured to transmit ProSe result information using the transceiver module 110.

Referring to FIG. 7, the network node 200 according to the present invention may include a transceiver module 210, a processor 220 and a memory 230. The transceiver module 210 may be configured to transmit signals, data and information to an external device and to receive signals, data and information from the external device. The network node 200 may be connected to the external device in a wired and/or wireless manner. The processor 220 may control operations of the network node 200 and may be configured to execute a function of processing information and the like to be transmitted/received between the network node 200 and the external device. The memory 230 may store processed information for a predetermined time and may be replaced by a component such as a buffer (not shown).

The network node 200 according to an embodiment of the present invention may be configured to assist ProSe between UEs. The processor 220 of the network node 200 may be configured to receive ProSe basic information from the UE 100 or another network node using the transceiver module 210. The processor 220 may be configured to transmit information indicating whether ProSe is permitted to the UE 100 using the transceiver module 210. The processor 220 may be configured to process signaling for supporting setup of a direct data path between the UE 100 and another UE, which is performed by the UE 100. The processor 220 may be configured to receive ProSe result information from the UE 100 using the transceiver module 210.

The configuration of the UE 100 and the network node 200 may be implemented such that the aforementioned embodiments of the present invention are independently applied thereto or two or more embodiments are simultaneously applied thereto. Redundant description is omitted for clarity.

The embodiments of the present invention may be achieved by various means, for example, hardware, firmware, software, or a combination thereof.

In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit may be located at the interior or exterior of the processor and may transmit data to and receive data from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention is not intended to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The aforementioned embodiments of the present invention are applicable to various mobile communication systems.

What is claimed is:

1. A method for supporting proximity services (ProSe) in a wireless communication system, the method performed by a first user equipment (UE) and comprising:

receiving a paging message in an idle mode, the paging message indicating a location information request for ProSe discovery; and transmitting a paging response in response to the indicated location information request, wherein no radio bearer or S1 bearer for a packet service is generated when the paging response is transmitted in response to the indicated location information request, wherein the ProSe are a scheme that supports communication between devices physically located close to each other, wherein the ProSe discovery is a process that identifies the first UE approaching a second UE using an E-UTRA (Evolved-UMTS Terrestrial Radio Access Network), and wherein the paging message instructs the first UE to not transmit a service request message or an extended service request message.

2. The method according to claim 1, wherein the received paging message defines:

transmitting an uplink signal to an eNode B via at least one uplink subframe other than a specific subframe on a second type component carrier; and at least whether location information is requested, a type of requested location information, whether a service request procedure of the first UE is performed, whether ProSe is involved or whether the paging response needs to include location information.

3. The method according to claim 1, wherein the paging message is received from a mobility management entity (MME).

4. The method according to claim 1, wherein:

the location information request is received via a first mobility management entity (MME) from a second network entity or the second UE; and the second network entity is a second MME, a server for the ProSe, an eNodeB or a Gateway Mobile Location Center (GMLC).

5. The method according to claim 1, wherein the paging response is a Non-Access Stratum (NAS) message or an Access Stratum (AS) message.

6. A user equipment (UE) for supporting proximity services (ProSe) in a wireless communication system, the UE comprising:

a radio frequency unit configured to transmit and receive information; and a processor configured to:

receive a paging message in an idle mode, the paging message indicating a location information request for ProSe discovery; and transmit a paging response in response to the indicated location information request, wherein no radio bearer or S1 bearer for a packet service is generated when the paging response is transmitted in response to the indicated location information request, wherein the ProSe are a scheme that supports communication between devices physically located close to each other, wherein the ProSe discovery is a process that identifies the first UE approaching a second UE using an E-UTRA (Evolved-UMTS Terrestrial Radio Access Network), and wherein the paging message instructs the first UE to not transmit a service request message or an extended service request message.

7. The UE according to claim 6, wherein the received paging message defines:

transmitting an uplink signal to an eNode B via at least one uplink subframe other than a specific subframe on a second type component carrier; and at least whether location information is requested, a type of requested location information, whether a service request procedure of the first UE is performed, whether ProSe is involved or whether the paging response needs to include location information.

8. The UE according to claim 6, wherein the paging message is received from a mobility management entity (MME).

9. The UE according to claim 6, wherein:

the location information request is received via a first mobility management entity (MME) from a second network entity or the second UE; and the second network entity is a second MME, a server for the ProSe, an eNodeB or a Gateway Mobile Location Center (GMLC).

10. The UE according to claim 6, wherein the paging response is a Non-Access Stratum (NAS) message or an Access Stratum (AS) message.

* * * * *